United States Patent [19]
Petitcollin et al.

[11] Patent Number: 5,549,726
[45] Date of Patent: *Aug. 27, 1996

[54] PROCESS FOR BENDING GLASS SHEETS USING FLUID BARRIER

[75] Inventors: Jean-Marc Petitcollin, Thourotte; Jean-Luc Lesage; Arnaud Borderiou, both of Compiegne, all of France

[73] Assignee: Saint-Gobain Vitrage International, Courbevoie, France

[*] Notice: The term of this patent shall not extend beyond the expiration date of Pat. No. 5,135,558.

[21] Appl. No.: 264,472

[22] Filed: Jun. 23, 1994

Related U.S. Application Data

[63] Continuation of Ser. No. 846,886, Mar. 6, 1992, Pat. No. 5,366,529, which is a continuation of Ser. No. 709,207, Jun. 3, 1991, Pat. No. 5,135,558.

[30] Foreign Application Priority Data

Jun. 1, 1990 [FR] France ................................. 9006842

[51] Int. Cl.$^6$ .............................................. C03B 23/035
[52] U.S. Cl. .............................. 65/106; 65/287; 294/64.2
[58] Field of Search .......................... 65/25.4, 106, 273, 65/287; 271/98; 414/797, 793; 294/64.1, 64.3, 64.2

[56] References Cited

U.S. PATENT DOCUMENTS

| | | | |
|---|---|---|---|
| 3,607,187 | 9/1971 | McMaster | 65/106 |
| 4,518,411 | 5/1985 | Frank et al. | 65/106 |
| 4,775,402 | 10/1988 | Letemps et al. | 65/273 |
| 4,778,506 | 10/1988 | Petitcollin et al. | 65/106 |
| 4,778,508 | 10/1988 | Petitcollin et al. | 65/273 |
| 4,793,466 | 12/1988 | Petitcollin et al. | 198/502.3 |
| 4,813,993 | 3/1989 | Letemps et al. | 65/273 |
| 4,865,638 | 9/1989 | Kudo | 65/273 |
| 4,871,385 | 10/1989 | Lecourt et al. | 65/273 |
| 5,007,949 | 4/1991 | Mathivat et al. | 65/106 |
| 5,017,210 | 5/1991 | Petitcollin et al. | 65/106 |
| 5,053,069 | 10/1991 | Vanaschen et al. | 65/106 |
| 5,053,604 | 10/1991 | Escaravage et al. | 219/483 |
| 5,069,704 | 12/1991 | Boutier et al. | 65/106 |
| 5,122,180 | 6/1992 | Mathivat et al. | 65/273 |
| 5,135,558 | 8/1992 | Petitcollin et al. | 65/106 |
| 5,366,529 | 11/1994 | Petitcollin et al. | 65/106 |

FOREIGN PATENT DOCUMENTS 2085464  12/1971  France.

*Primary Examiner*—David L. Lacey
*Assistant Examiner*—Steven P. Griffin
*Attorney, Agent, or Firm*—Oblon, Spivak, McClelland, Maier & Neustadt, P.C.

[57] ABSTRACT

A process for bending a glass sheet according to which the glass sheet is heated in horizontal position until its bending temperature is reached and is brought into contact with an upper bending form by a force of a pneumatic nature. A fluid barrier is generated at the periphery of the glass sheet, the fluid barrier limiting the entry and exit of air near the upper bending form.

8 Claims, 1 Drawing Sheet

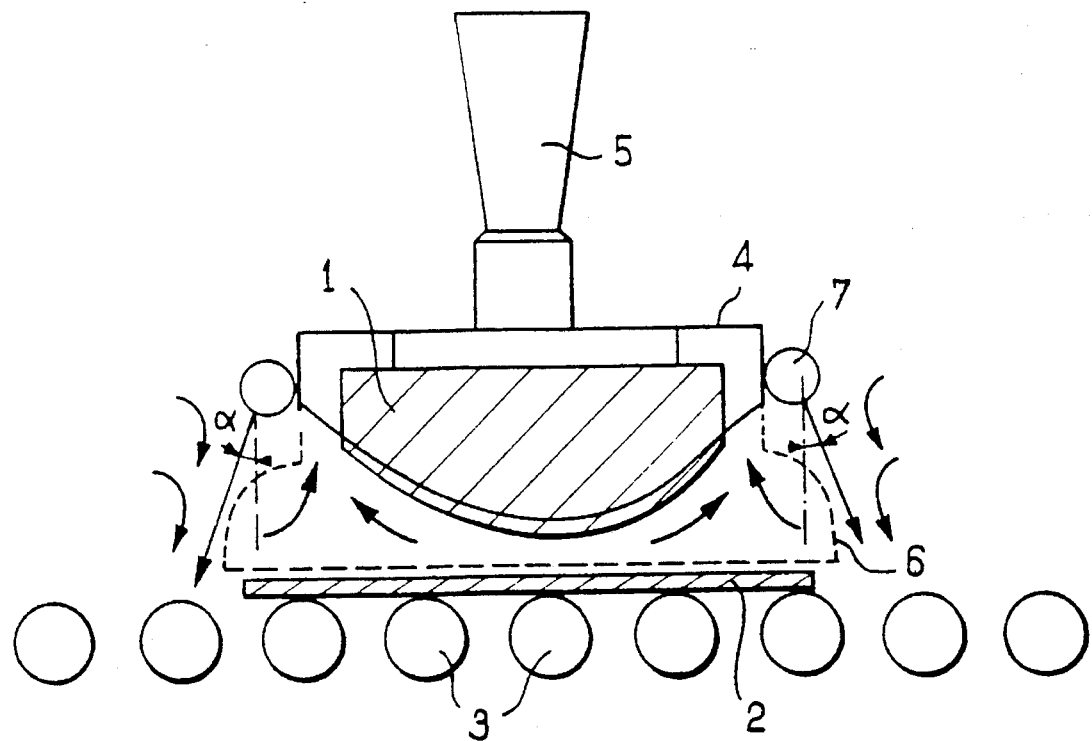
FIG_1
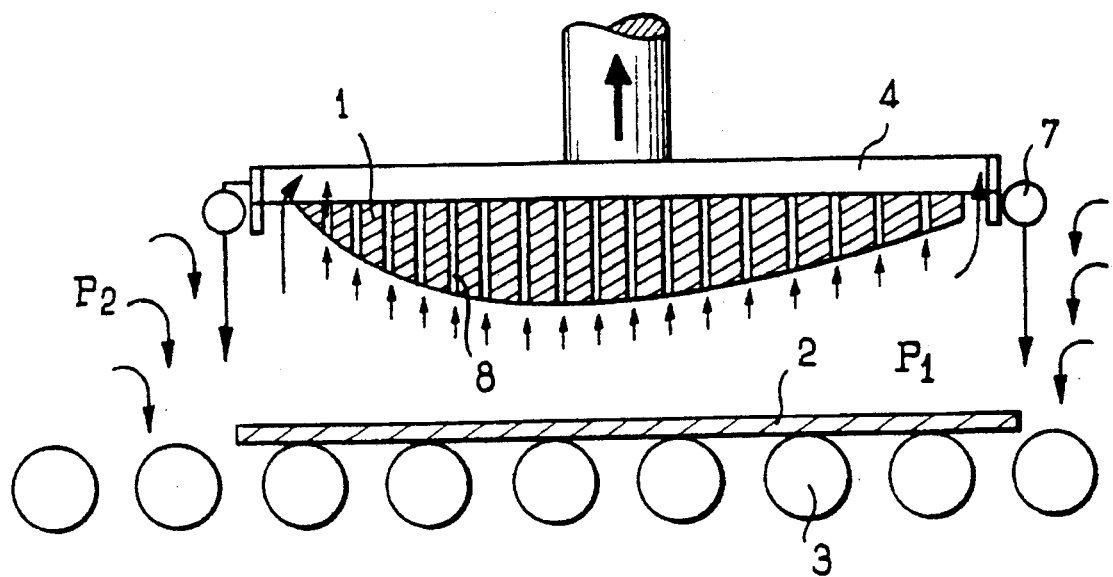
FIG_2

PROCESS FOR BENDING GLASS SHEETS USING FLUID BARRIER

This is a continuation, of application Ser. No. 07/846,886, filed on Mar. 6, 1992, now U.S. Pat. No. 5,366,529, which is a continuation of application Ser. No. 07/709,207, filed on Jun. 03, 1991, now U.S. Pat. No. 5,135,558.

FIELD OF THE INVENTION

The invention relates to techniques for production of bent, and optionally tempered, glazings generally intended for equipping motor vehicles. More precisely, the invention relates to such techniques in which each glass sheet is heated in a horizontal position until its bending temperature is reached, is brought into contact with an upper bending form by a force of pneumatic nature, for example by suction, is shaped by application against this upper bending form and/or by a lower bending form and/or other bending tools, and finally undergoes a controlled cooling, for example of the heat tempering type.

DESCRIPTION OF THE RELATED ART

According to these techniques, the glass sheet goes through a heating furnace on a bed of drive rollers which brings it into a bending station. In the latter, the glass sheet is lifted above the roller bed by a pneumatic force. The rise of the glass sheet is completed on contact with an upper bending form whose curvature it assumes, the shaping optionally being supplemented, for example, by a shaping by inertia and gravity due to dropping on a lower bending form and/or a pressing.

The pneumatic force acting on the glass sheet, in a first variant of these techniques, is generated by a suction through the upper form provided for this purpose with suction orifices (EP-B-3 391). But if the partial vacuum exerted is too strong, these orifices cause a marking of the glass sheet. When the initial distance between the orifices and the glass sheet is large, it is necessary to increase the level of the partial vacuum to succeed in causing the lift-off of the glass. In practice, this technique therefore is suitable only if the entire face (turned toward the glass) of the upper form can be lowered very close to the surface of the glass sheet, which initially assumes a plane or barely curved form.

In a second variant, known particularly from patents or patent applications FR-B-2 085 464, EP-A-240 418, EP-A-241 355 and EP-A-255 432, the pneumatic force acting on the glass sheet is obtained by a peripheral suction. This technique of taking up the glass sheet is advantageously polyfunctional, i.e., it can be used with a great number of bending processes such as, for example, processes comprising dropping a glass sheet on a frame open in its center, or deformation against an upper bending form and/or by pressing. Further, the optical quality obtained is particularly great because the contacts between the glass sheet and the bending tools are relatively limited, the glass sheet not being either lifted mechanically (because of the peripheral suction) or applied at its central part against the upper bending form, which avoids formation of optical defects in this zone. To this high optical quality are added simple and convenient replacement of the covering that covers the upper bending form (which does not have to be pierced) and the possibility of working with an upper bending form whose dimensions are smaller than those of the glass sheet, so that possible enameled parts of the glazing are not in contact with the upper bending form.

To create a sufficient pressure difference between the two faces of the glass sheet, there is constituted a chamber closed on top by the upper bending form, below by the glass sheet and on the sides by the lateral walls or wall portions of a bottomless box also called a skirt, this chamber being depressurized, for example, by an air jet pump. To avoid marking the glass, this skirt should be slightly separated from the glass sheet and a leak necessarily results, which cannot be reduced even if the skirt is shaped. But this leak by definition generates a loss of efficiency of the suction and constitutes the main limitation to the intensity of the force acting on the glass sheet, particularly at the most critical moment of the process, i.e., during lift-off of the glass sheet.

It has been proposed in a first step, in FR-B-2 085 464, to use shaped skirts to effectively channel the lateral leaks and to bring the skirt as low as possible during taking up of the glass sheet. However, this technique is not without a drawback: first of all, it requires a very fine adjustment of the height position of the skirt, an adjustment made difficult by the phenomena of expansion of the tools due to the high temperature prevailing in the bending station and yet essential to keep the skirt and/or the bending form from striking and marking the glass sheet. Further, the skirt is in the way during replacement of a bending form or replacement of the paper or fabric insert used to cover the surface of contact of the upper form with the glass.

On the other hand, practice has shown that beyond a certain complexity of glazing forms, it is not possible to obtain a perfect application of the glass sheet on the upper form simply by suction. One of the solutions already proposed for this problem is to supplement the pneumatic application by a mechanical pressing by a pressing frame, but then the presence of the bottom of the skirt hinders introducing this pressing frame under the glass sheet. The skirt also creates a total lack of visibility which is very harmful during adjustments of the form and/or of the pressing time. Further, the pressing frame and equipment that is joined with it should be small enough to be housed under the skirt which prevents a pressing by a tempering frame. Finally, in the case of dropping the glass sheet on a bending and tempering frame, open in its center, the skirt imposes a relatively large drop height: the inertia effect of the drop is therefore greater, hence a danger of double bending, i.e., of obtaining undesired curves. Moreover, the greater the drop height, the more problems of drop delay (due particularly to gluing effects of the enamels) generating difficulties, for example, linked to the poor positioning of the glass sheet on the frame and especially curve defects when the glazing does not fall flat but more or less crosswise.

In patent applications EP-A-241 355 and EP-A-240 418, it was proposed to operate with a short skirt, leaving a part of the bending form visible. This solution makes it possible to eliminate most of the above-mentioned drawbacks, but it is essentially limited to the use of upper bending forms exhibiting a less pronounced curve, without which the initial suction cannot be sufficient to make the glass sheet separate from the roller bed. To remedy this, patent application EP-A-241 355 discloses a double-wall skirt, the outside walls being retractable to allow the introduction of a pressing counterform under the glass sheet, but this latter solution does not make it possible to work with all types of pressing frames because of the smallness of the space under the skirt, smallness which excludes the use of a process involving dropping of the glass sheet (because such a process requires a relatively large frame) and, moreover, the absence of visibility is always total.

Finally, in a third variant of these forming techniques, the glass sheet is lifted and applied against the upper form by a rising hot gas current. But there again it is relatively difficult to exert a sufficient force to apply the sheet correctly on the curved surface, the jets directed toward the central part of the sheet having the tendency, by draining off on the sides, to deflect toward these sides the lateral jets directed toward the marginal areas of the glazing so that these lateral jets have a reduced impact force, which force is already reduced by the fact that the jets do not act essentially perpendicularly to the upper form but with a certain angle relative to the perpendicular due to the curve of the upper form.

All these known approaches of the art are in practice largely satisfactory with most of the usual sheets. But for those that exhibit the most complicated shapes, a good quality is often obtained only at the price of long adjustments or technical compromises which do not allow the operator as great a freedom of action as he could desire.

SUMMARY OF THE INVENTION

The invention has as an object a bending process and device including the taking up the glass sheets, making possible the simultaneous exertion of a great force at the moment of lift-off, a correct application against a possibly very greatly curved upper bending form, the introduction under the upper bending form of tools for bending and/or recovery of glass sheets and finally a good visibility of the glass sheet during its treatment.

This object is achieved according to the invention by a bending process according to which the glass sheet is heated in horizontal position until its bending temperature is reached and is brought into contact with an upper bending form by a force of pneumatic nature, a fluid barrier being generated on the periphery of the glass sheet, said fluid barrier channeling the gases exerting said pneumatic force and limiting the entry of outside air near the upper bending form.

The fluid barrier generated just at the periphery of the glass sheet—but not in contact with it—constitutes a sort of skirt which helps in taking up the sheet, which is achieved either by suction through or at the periphery of the upper form or by a rising flow of hot air. It thus totally or partly replaces the mechanical skirt known in the art, all of whose functions it advantageously provides, with the further advantage of perfect transparency. Depending on the complexity of the desired glazing shape, the height of the vertical transfer of the glass sheet and the presence of other means acting on the glass sheet (the three "types" of pneumatic force listed above can actually be partially combined), the fluid barrier can cover all or part of the perimeter of the glass sheet. The fluid barrier can also be associated with a very short skirt which provides a slight leak at the end of the shaping operation, the fluid barrier then essentially serving during the separation phase.

Advantageously this fluid barrier is generated by jets of compressed air preferably coming from a ramp mounted integral with the upper bending form, the divergence of the jets on leaving the ramp providing the continuity of the barrier and thus the fluid tightness essential for obtaining a "skirt" effect. Of course, this barrier should not oppose the rise of the glass sheet. Since when the chamber is being put under partial vacuum, the air jets are drawn toward the center, it is preferable to operate with oblique jets deviating from the glass sheet and which are then brought together by the effect of the vacuum.

According to another embodiment of the invention, the compressed air ramp is mounted stationary, set in the roller conveyor conducting the glass sheets from the furnace to the bending station.

It is also possible to use slotted nozzles directly forming a continuous air layer or a lip mounted directly on a tube.

The process according to the invention is remarkable in that it is suitable for a very great number of bending processes. Thus, as indicated above, the pneumatic force acting on the glass sheet can be due to peripheral suction of the glass sheet, to a rising hot current or a suction through the bending form for the continuation of the operation or also by a combination of these means. Moreover, it is possible to operate with a plane upper bending form—so that the bending is performed by dropping on a lower bending form generally performing the function of a tempering frame—or with a curved upper bending form—so that all or part of the bending of the glass is performed during the application against the upper bending form. In any case, the fluid barrier according to the invention simplifies the introduction of equipment of the tempering frame and/or pressing frame type under the upper bending form. Further, the much better visibility which results from the use of a fluid barrier helps in the interpretation of phenomena actually occurring on contact with the upper bending form which, if necessary, allows a suitable modification of the adjustments of the equipment.

The "skirt" effect obtained with the fluid barrier, of course, functions slightly differently according to the nature of the pneumatic force acting on the glass sheet. With a suction, the fluid barrier makes it possible to define a sort of chamber in which the vacuum is created. With a blowing, the fluid barrier will partly act as a deflector by sending the deviated blown gases toward the glass sheet. But in any case—whether it be a very slight leak around the glass sheet or the deflection of rising currents—the fluid barrier according to the invention makes possible a greater "effectiveness" of the pneumatic force which, if necessary, makes it possible to reduce its intensity. A relatively weak suction force suffices to create a pressure difference between the two faces of the glazing sufficient to make the glass sheet rise. Movement of the glass sheet against the upper form can thus be performed under particularly gentle conditions, without fear of marking the glass. Whereas with the known devices of the art, the initial suction must be very strong and is then reduced in the phase of shaping the glass, with a fluid barrier according to the invention, the necessary vacuum level at the beginning of the process is so low that, on the contrary, it is advantageous to increase the partial vacuum at the end of the application, which allows the glass sheet to better fit the contours of the form. More particularly, the lift-off phase can be considered as not absolutely critical and then the partial vacuum level can be selected exclusively in consideration of the shaping on contact with the upper form.

A very advantageous example of application of the invention is that of the production of moderately bent glazings which will take advantage of this increased efficiency of the pneumatic force. Thus in numerous cases the limit beyond which a mechanical pressing proves necessary will be slightly extended, the sheet being bent simply by the pneumatic force applying it against the curved upper bending form.

Even if the shape is not entirely achieved by this pneumatic application, the bending difference to be made up by mechanical pressing is still reduced so that the pressing can be performed, leading to a minimum of sliding. Under these conditions, it can then be considered to proceed to the slight pressing by the tempering frame which obviously is advantageous from the viewpoint of the rate of production and equipment cost. In this case, it is important to cover the tempering frame with a fabric not promoting marking too much, such as taught by European patent application No. 312 439.

It has further been noted that this air current at high speed creates a "venturi" effect. The partial vacuum thus generated is able to be on the order of 10 mm of a water column, a figure approaching the value on the order of 15 mm of a water column which is necessary to lift the glass sheet. This partial vacuum thus contributes to the lift-off and lightening of the sheet during the centering phase which generally precedes the suction. To benefit from this lightening during centering, the fluid barrier is generated before the intervention of the pneumatic means of suction and blowing starts, i.e., as soon as the glass sheet penetrates the space located below the form.

BRIEF DESCRIPTION OF THE DRAWINGS

Other details and advantageous characteristics of the invention will come out from the following description with reference to the accompanying drawings which represent:

FIG. 1 is a schematic side view of a bending-tempering installation with an upper bending form surrounded by a fluid barrier, and indicating in dash lines a conventional construction; and FIG. 2 is a schematic view of a sucking bending form with suction boosted by a fluid barrier according to the invention.

DETAILED DESCRIPTION OF THE PREFERRED EMBODIMENTS

FIG. 1 shows the characteristic elements of the bending cell of a bending-tempering installation operating essentially according to the principle of patent FR-B-2 085 464, except as noted below. In a way which is well known and therefore not shown here, the glass sheets are charged at the input of an electric furnace on a roller conveyor which extends to the output of the furnace. The travel of the glass sheets is stopped under an upper bending form 1, this stopping generally being performed in cooperation with centering means. Upper bending form 1 in the example selected here consists of a greatly curved piece of sheet metal corresponding to the shape it is desired to impart to glass sheet 2 delivered by rollers 3. Upper bending form 1 is placed in a bottomless suction box 4 whose side walls form a skirt which surrounds upper form 1 to define around the latter a leak space when box 4 is put in a partial vacuum by pump 5 to generate a suction force.

To make the glass sheet rise and to apply it against the upper bending form, it is necessary that the suction force be maximum at the moment of lift-off and for the final application of the most curved parts.

According to patent FR-B-2 085 464, this is achieved by the use of a "long" shaped skirt (represented in FIG. 1 by dash lines 6). As explained above, this long skirt constitutes an obstacle which is hard to get around and which is in the way merely by its physical bulk. Moreover, all types of pressing frames cannot be housed inside such a skirt. The solution proposed in the embodiment of the invention shown in FIG. 1 consists of a very short skirt, whose dimensions are ideal at the end of application against the upper bending form, supplemented by a fluid barrier.

The fluid barrier here is generated by a ramp (e.g., conduit) 7 fed with compressed air and provided with a series of orifices. A small air volume, high air velocity system is advantageously used. On the other hand, to take into account the effect of the attraction of the vacuum, the fluid barrier is initially dimensioned slightly larger than the glass sheet and angled obliquely to the vertical, aperture angle $\alpha$, for example, being between 15° and 25° or even more.

The position of the orifices of the ramp and the air pressure are optimized to replace the conventional skirt with a fluid barrier. By way of example, a skirt 100 mm in height may be replaced by a fluid barrier obtained from a ramp fed at a pressure of 5 bars ($5 \cdot 10^5$ PA), drilled with 200 holes 1 mm in diameter and placed at a constant pitch of 5 mm. If it is desired to replace a skirt of 40 mm, it will be possible to work with a lower feed pressure, or to space the holes a little farther which, for example, can be between 7 and 10 mm. The latter value should not be exceeded by too much because then the spaces between two adjacent jets may be wide enough to let induced air currents pass. Compressed air feed pressures greater than 5 bars can be used and optionally allow holes that are more widely spaced. For these purposes, it is advantageous to have means to make the pressure of the blown compressed air vary.

It should be noted that the ramp can cover only a part of the perimeter of the glass sheet and be placed, for example, only opposite the areas where the distance to be traveled by the glass sheet is the greatest.

Ramp 7 is preferably mounted directly on suction box 4 and is integral with the up and down movements of the box. For this purpose, the connection with the central compressed air circuit is performed, for example, by a hose. It should be noted that, given the small projected compressed air delivery volume and the fact that these jets are never directed toward the glass sheet, it is not necessary that the air be preheated to the bending temperature. However, in order not to disturb the thermal equilibrium of the bending station and to avoid cooling the closest part of the glass sheet, it is preferable to provide at least one preheating of the jets, for example, by making the feed ducts go through the furnace for heating the glass sheets. On the other hand, the ramp is preferably placed so that the fluid barrier constitutes a real continuation of the bottomless suction box, preventing the penetration of induced air between the ramp and box.

In a variant embodiment of the invention, the compressed air ramp is in a stationary position relative to the conveyor. However, this arrangement is not preferred, since it is then more difficult to induce the fluid barrier to extend the bottomless box in a relatively airtight manner.

In the embodiment of FIG. 1, the pneumatic force which acts on the glass sheet is exclusively due to the peripheral suction. However, the invention is not limited to this first type of shaping process and the pneumatic force can be generated in whole or in part by a suction through the upper form itself, pierced with suction holes 8, as can be seen in FIG. 2. In this case, the fluid barrier according to the invention contributes to weakening the value of pressure $P_1$, under upper bending form relative to outside pressure $P_2$, this being opposed to the penetration of induced air currents. For this reason, the lift-off of the glass sheet is performed more easily.

As is clear from FIGS. 1 and 2, the glass sheet remains perfectly visible during the entire period of its application against the upper bending form. The space located under and on the side of the glass sheet is also perfectly visible, which allows the introduction of any type of equipment and particularly of pressing or tempering frames.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. Process for bending a glass sheet comprising the steps of:

heating the glass sheet in a horizontal position to a bending temperature thereof;

bending the glass sheet by bringing the heated glass sheet into contact with an upper bending form in an air atmosphere by use of a pneumatic force;

centering the glass sheet beneath the upper bending form prior to said bending step, including a step of creating a partial vacuum between the bending form and the glass sheet by generating high pressure gas jets which produce a venturi effect adjacent a periphery of the glass sheet; and continuing to generate the high pressure gas jets so as to generate a fluid barrier adjacent the periphery of the glass sheet during said bending step, said fluid barrier comprising the high pressure gas jets which limit the entry of air from an exterior of the fluid barrier at the immediate vicinity of the upper bending form.

2. Process according to claim 1, wherein the pneumatic force comprises suction applied through the upper bending form.

3. Process according to claim 1, wherein the pneumatic force comprises suction applied at the periphery of the glass sheet.

4. Process according to claim 1 wherein the pneumatic force comprises applying a rising flow of hot air to the glass sheet.

5. Process according to claim 1, including the step of increasing the intensity of the pneumatic force when the glass sheet comes in contact with the upper bending form.

6. Process according to claim 1, wherein said high pressure gas jets are directed downward and obliquely to the vertical direction.

7. Process according to claim 1, wherein said high pressure jets are directed vertically downward.

8. Process according to claim 1, wherein the fluid barrier covers only a part of the periphery of the glass sheet to be bent.

* * * * *